US Patent 3,834,989
Patented Sept. 10, 1974

3,834,989
MICROBIOLOGICAL PROCESS
David E. F. Harrison, Faversham, England, assignor to Shell Oil Company, Houston, Tex.
Filed Feb. 3, 1972, Ser. No. 223,348
Claims priority, application Great Britain, Feb. 19, 1971, 5,003/71
Int. Cl. C12b 1/00
U.S. Cl. 195—28 R    5 Claims

ABSTRACT OF THE DISCLOSURE

Micro-organisms are produced by inoculating with micro-organisms a sterile liquid growth medium containing assimilable sources of nitrogen and essential mineral salts, allowing the micro-organisms to grow, and then adding fresh sterile growth medium containing a sterilizing concentration of a microbiocide which, at the lower concentrations produced by admixture of the fresh medium with the inoculated medium, is metabolizable by the micro-organisms.

FIELD OF THE INVENTION

Figure 1:
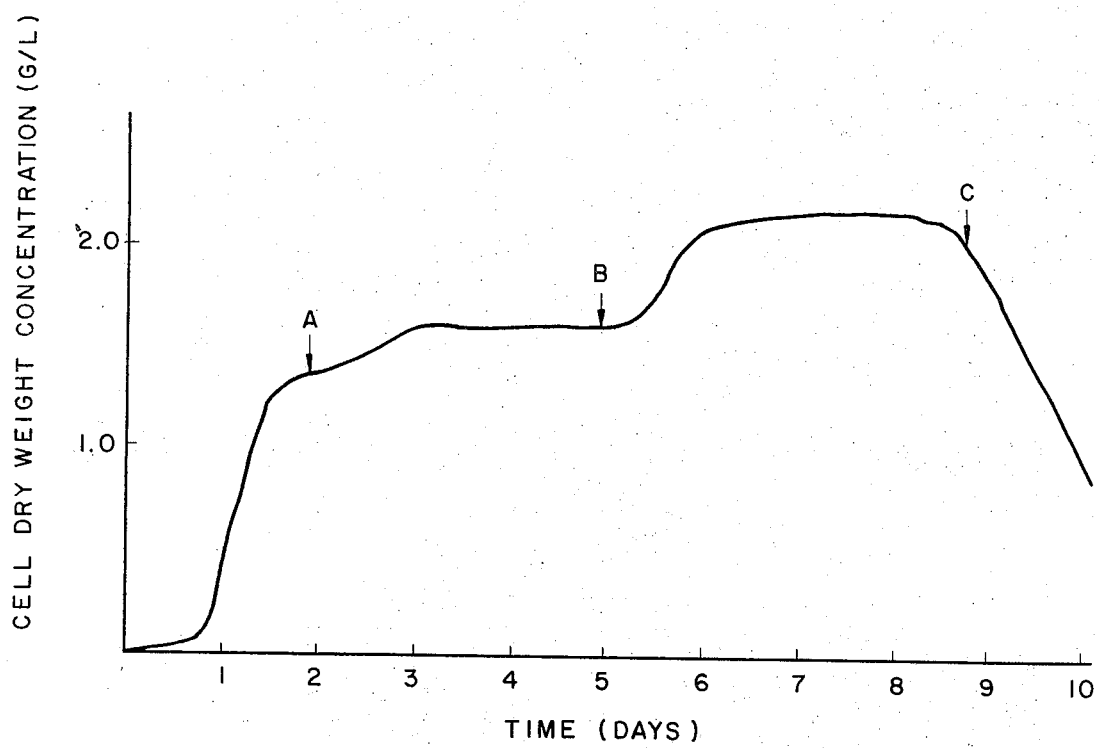

This invention relates to a process for the production from hydrocarbons of edible micro-organisms in purified form.

DESCRIPTION OF THE PRIOR ART

Conventional fermentation processes are carried out either batchwise or continuously. In the former a usually liquid growth medium in a fermenter vessel is inoculated with the micro-organism which is then allowed to grow. When the growth is complete (i.e., a stationary state is reached) the medium is removed from the vessel and the product extracted. The process is then repeated with a fresh quantity of medium. In a continuous fermentation, medium containing the cultured micro-organism is continuously removed from the vessel while at the same time fresh medium is added to the vessel.

In order to achieve a satisfactory aseptic fermentation it is essential that the growth medium should be completely free of other viable micro-organisms which would also multiply under the conditions of the fermentation. Up to now the preferrem method of medium sterilization has been by the use of heat, for example by the use of superheated steam. For continuous fermentations in particular, which require large amounts of medium, the use of heat sterilization contributes significantly to the capital and operating costs of the process. Moreover, once the medium has been sterilized special precautions have to be taken to avoid contamination before it is introduced into the fermentation vessel. This problem arises especially in continuous and semi-continuous processes which require the maintenance of large reservoirs of sterile medium.

SUMMARY OF THE INVENTION

It has now been found that the fermentation medium may be sterilized by an alternative method wherein a microbiocide capable of being metabolized by the growing micro-organisms is inoculated into the medium.

DESCRIPTION OF THE PREFERRED EMBODIMENTS

The process for the production of micro-organisms according to the invention comprises inoculating with a culture of the micro-organism a sterile liquid growth medium containing assimilable sources of nitrogen and essential mineral salts, allowing the micro-organism to grow in the presence of a source of assimilable carbon and, if necessary, a source of gaseous oxygen, and adding fresh sterile growth medium to the inoculated medium during the growth of the micro-organism, wherein the fresh growth medium contains a sterilizing concentration of a microbiocide which, at the lower concentration produced by admixture of the fresh medium with the inoculated medium, is metabolizable by the growing micro-organisms.

Many micro-organisms are known, which can utilize an organic compound containing a single carbon atom in its molecule as their sole source of assimilable carbon. The protein-rich biomass obtainable by the cultivation of such micro-organisms has been considered as a possible food-stuff or food-supplement for man and animals. Examples of such micro-organisms are methane-consuming micro-organisms such as those of the species *Methyloccus* and those of the species *Methanomonas* and methanol-consuming micro-organisms such as *Pseudomonas extorquens* NCIB No. 9399, *Protaminobacter ruber* NCIB No. 2879 and those of species *Hyphomicrobium*. Within the term "micro-organisms" used herein we include mixtures of micro-organisms.

The process of the present invention is particularly suitable for the cultivation of these types of micro-organisms, since it has been found that they are capable of assimilating low concentrations of the strongly bacteriocidal compound formaldehyde in the presence of the more usual substrates methane or methanol. Thus, the fresh medium which is to be fed to a continuous or semi-continuous fermentation may contain a concentration of formaldehyde, suitably 0.01–10% weight per volume, which is toxic to micro-organisms. In this way the medium is maintained in a sterile condition right up to the moment at which it is added to the medum containing the actively growing micro-organism. When formaldehyde-containing medium is introduced the formaldehyde concentration is reduced to a sub-toxic concentration by dilution, and, since at such concentrations the formaldehyed is rapidly metabolized by the micro-organism, a build-up of the formaldehyde concentration during the continuous addition is prevented. It has been found that the micro-organism *Ps. extorquens* NCIB No. 9399 can grow in the presence of up to about 0.5 millimoles per liter formaldehyde in the culture medium.

In practice, the following precautions should be observed to avoid the presence of toxic concentrations of formaldehyde in the inoculated medium:

(a) at the start up of the fermentation the sterilization of the initial volume of medium should preferably not be by the use of formaldehyde since this would require a concentration of the chemical, which would also be toxic to the micro-organism to be grown.
(b) the addition of the medium containing the formaldehyde should be sufficient slow to avoid accumulation of formaldehyde in the culture.
(c) the supply of oxygen should not become limiting for growth, since, if it did the micro-organism might not be able to achieve maximum utilization of the formaldehyde which would then accumulate eventually to toxic concentrations.

When the above precautions are observed successful fermentations may be carried out in the presence of formaldehyde with the following advantages:

(a) steam sterilization of medium is largely avoided except for the relatively small volume of medium at start-up.
(b) "growth-back" of the micro-organism along the medium supply line is prevented.
(c) contamination of the medium reservoir and supply lines is prevented.
(d) additions may be made to the medium without using sterile transfer techniques.

Although the invention has been described mainly by reference to the use of formaldehyde in the production of $C_1$-utilizing micro-organisms, it will be apparent to those skilled in the art that the process of the invention is also applicable to the production of micro-organisms capable of assimilating other types of bacteriocidal compounds, for example, phenols, alcohols, other aldehydes, carboxylic acids and antibiotics.

The invention is now illustrated in the following examples in which the aqueous growth medium used is designated $D_2$ and has the following composition:

|  | Grams per liter |
|---|---|
| $Na_2HPO_4 \cdot 12H_2O$ | 3.0 |
| $KH_2PO_4$ | 3.0 |
| $(NH_4)_2SO_4$ | 3.0 |
| $MgSO_4 \cdot 7H_2O$ | 0.1 |
| Standard concentration solution containing trace elements, 2 milliliters per liter. | |

EXAMPLE I

Bacteriocidal properties of formaldehyde

The bacteriocidal properties of formaldehyde on methanol-utilizing bacteria were investigated as follows:

50 milliliters of $D_2$ medium was added to each of twenty-two 500 milliliters shake flasks, followed by amounts of methanol, formaldehyde, and/or glucose indicated in Table I. An inoculum rich in methanol-utilizing organisms was prepared by taking 10 grams of soil from a patch of earth which had previously been treated regularly with methanol over a period of 3 months, and 10 grams of soil from untreated earth and suspending the samples in 50 milliliters of a *Pseudomonas extorquens* NCIB No. 9399 culture grown on methanol and having a cell dry weight concentration of 3 grams per liter. 0.1 milliliters of this suspension was used to inoculate each shake flask.

As a control, one flask containing 1.0% methanol and no formaldehyde was heated in an autoclave with steam at 15 pounds per square inch for 15 minutes. All the flasks were then incubated at 30° C. in a shaker. The flasks were examined for micro-organism growth after 3–5 days and the results are shown in Table I. It will be seen that all the flasks containing formaldehyde showed no growth of micro-organisms. Formaldehyde is therefore an efficient bacteriocide at concentrations down to 0.1% weight by volume.

To check that the action of formaldehyde was in fact bacteriocidal and not bacteriostatic, 0.1 milliliters of the culture in each flask showing no growth after 4 days incubation was transfered to 50 milliliters medium containing 1% methanol in 500 milliliter shake flasks and incubated for a further 5 days. No growth occurred except in the case of the sample from flask 22 which contained no glucose, methanol or formaldehyde. These flasks were then inoculated with a *Ps. extorquens* NCIB No. 9399 culture and incubated. In each case growth occurred showing that the residual formaldehyde content was insufficient to inhibit growth.

TABLE I

| | Flask contents, 50 ml. $D_2$ plus | | | Micro-organism growth after— | | |
|---|---|---|---|---|---|---|
| Flask number | Methanol, percent | Formaldehyde, percent | Glucose, percent | 3 days | 4 days | 5 days |
| 1 | 0.5 | | | ++ | +++ | +++ |
| 2 | 1.0 | | | +++ | ++++ | ++++ |
| 3 | 2.5 | | | + | ++ | +++ |
| 4 | 5.0 | | | − | − | − |
| 5 | 0.5 | 0.1 | | − | − | − |
| 6 | 0.5 | 0.5 | | − | − | − |
| 7 | 0.5 | 1.0 | | − | − | − |
| 8 | 0.5 | 2.5 | | − | − | − |
| 9 | 0.5 | 5.0 | | − | − | − |
| 10 | 1.0 | 0.1 | | − | − | − |
| 11 | 1.0 | 0.5 | | − | − | − |
| 12 | 1.0 | 1.0 | | − | − | − |
| 13 | 1.0 | 2.5 | | − | − | − |
| 14 | 1.0 | 5.0 | | − | − | − |
| 15 | | | 1.0 | +++ | ++++ | +++++ |
| 16 | | 0.1 | 1.0 | − | − | − |
| 17 | | 0.5 | 1.0 | − | − | − |
| 18 | | 1.0 | 1.0 | − | − | − |
| 19 | | 2.5 | 1.0 | − | − | − |
| 20 | | 5.0 | 1.0 | − | − | − |
| 21 (control) | 1.0 | Heat sterilized | | − | − | − |
| 22 (control) | | | | − | − | − |

EXAMPLE II

Effect of formaldehyde on a continuous culture of *Ps. extorquens*

A 7 liter capacity fermentation vessel fitted with a stirrer, sparger, and temperature and pH controls was charged with 4 liters of $D_2$ medium containing 0.58% weight per volume of methanol. This medium was inoculated with a 48 hour shake flask culture of *Ps. extorquens* NCIB No. 9399 which was then allowed to grow. The temperature in the vessel was maintained at 30° C. and the pH at 6.4 and the culture was vigorously stirred and aerated. The progress of the fermentation was followed by regular analysis of samples of the culture to determine the cell dry weight concentration of the medium. The results are plotted in FIG. 1.

When the culture had reached the stationary state (i.e., its optical density was unchanged over a period of 4 hours), continuous culture was commenced by supplying $D_2$ medium containing 0.58% methanol at a rate of 250 milliliters per minute to the vessel (point A). The total volume of medium in the vessel was maintained constant at 4 liters by pumping medium out through an outlet at a fixed height above the base of the vessel.

After 4 days of continuous fermentation the medium was charged to $D_2$ containing 0.58% weight per volume methanol and 0.25% weight per volume formaldehyde (point B). Fermentation was continued for a further 4 days after which the medium was charged to $D_2$ containing 0.75% formaldehyde and no methanol (point C).

It can clearly be seen from FIG. 1 that when 0.25% weight per volume formaldehyde was included in the medium the cell dry weight concentration rose from 1.6 to 2.16 grams per liter showing that not only does the culture survive in the presence of a small concentration of formaldehyde, but is in fact able to use the formaldehyde as a substrate, thus maintaining the concentration of the formaldehyde in the vessel at a sub-toxic level. However, when no methanol was present in the medium wash-out of the culture occurred showing that the micro-organism cannot grow on formaldehyde alone.

EXAMPLE III

Typical continuous culture of *Ps. extorquens* using formaldehyde sterilization 4 liters of $D_2$ medium in a fermentation vessel similar to that used in the previous example was sterilized at 120° C. for 20 min. After cooling the medium, sterile methanol was added to give a concentration of 1.0% weight per volume. The medium was inoculated with 20 milliliters of a 48 hour culture of *Ps. extorquens* NCIB No. 9399 and incubated until a stationary state was reached (32 hours). The vessel was then supplied continuously at 50 milliliters per hour with D medium containing 1.0% weight per volume methanol and 0.25% weight per volume formaldehyde.

Throughout the fermentation the culture volume was maintained at 4 liters, the temperature at 30° C., and the pH at 6.4 by addition of M sodium hydroxide solution. The medium was stirred at 1,300 r.p.m. and air was supplied at 3.5 liters per min.

A steady state corresponding to a cell dry weight concentration of 2.4 grams per liter was reached and maintained for over 1000 hours. During this time no contamination of the culture occurred, showing that formaldehyde can be used to maintain the medium in a sterile condition over substantial periods.

EXAMPLE IV

Continuous culture of a methane-utilizing micro-organism using formaldehyde sterilization A continuous culture of a methane-utilizing micro-organism (*Methanomonas* sp.) was established in a 2 liter fermentation vessel containing $D_2$ medium under the following conditions:

Temperature: 34° C.
Stirring rate: 1200 r.p.m.
pH: 6.7
Gas supply: 2 liters per min. of 1:1 methane/air mixture
$D_2$ medium supply: 30 milliliters per hour The course of the culture was followed by regular measurements of the optical density and these results are plotted in FIG. 2.

After 4 days of continuous culture the medium was changed to $D_2$ containing 0.1% weight per volume formaldehyde (point D), and after a further 2½ days the rate of medium supply was increased to 46 milliliters per hour (point E).

Figure 2:
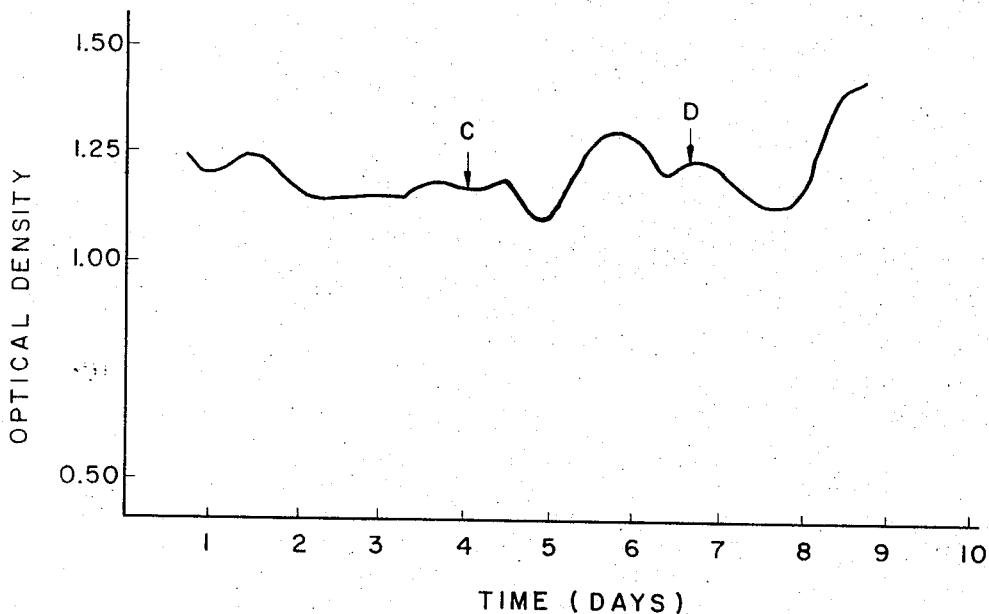

It is clear from FIG. 2 that the addition of formaldehyde to the medium fed to a continuous culture of methane-consuming micro-organisms has no adverse effect upon the culture and that this represents a convenient method of sterilizing the medium in such cultures.

I claim as my invention:

1. In a process for the production of micro-organisms of the species *Methanomonas* sp., *Protaminobacter ruber* NCIB No. 2879, or *Pseudomonas extorquens* NCIB No. 9399, wherein the microorganisms are grown in a culture in the presence of a source of assimilable carbon and a growth medium containing a source of assimilable nitrogen and nutrient salts and fresh growth medium is supplied intermittently or continuously to the culture, the improvement which comprises sterilizing the fresh growth medium prior to its addition to the culture by the incorporation therein of a sterilizing amount of formaldehyde that is assimilable by the microorganism and adding the fresh growth medium containing said formaldehyde to the culture at a rate and in amounts to yield by dilution thereof a sub-toxic assimilable concentration of formaldehyde in the culture thereby preventing eventual accumulation of toxic concentration of formaldehyde in the culture.

2. A process according to claim 1 wherein the microorganisms are grown in the presence of a gas containing free oxygen.

3. A process according to claim 1 wherein the source of assimilable carbon is methane or methanol.

4. A process according to claim 3 wherein the formaldehyde concentration in the fresh growth medium is 0.01 to 10% by weight per volume of the medium.

5. A process according to claim 3 wherein the formaldehyde concentration in the fresh growth medium is 0.1 to 0.25% by weight per volume of the medium.

References Cited

UNITED STATES PATENTS

| 3,041,250 | 6/1962 | Wolnak et al. | 195—123 |
| 2,464,197 | 3/1949 | Clark | 195—123 |
| 2,964,406 | 12/1960 | Strandskov | 195—123 |
| 3,642,578 | 2/1972 | Hitzman et al. | 195—28 |

OTHER REFERENCES

Chem. Abstracts, 54:18676c (1960).

Johnson et al., Biochem. Journal 93, pp. 281–290 (1964).

Chem. Abstracts, 75:18593d.

Patel, et al., J. of Bacteriology, vol. 107, No. 1, pp. 187–191.

A. LOUIS MONACELL, Primary Examiner

T. G. WISEMAN, Assistant Examiner

U.S. Cl. X.R.

195—49, 96, 123